US006840156B1

(12) United States Patent
Gillman et al.

(10) Patent No.: US 6,840,156 B1
(45) Date of Patent: Jan. 11, 2005

(54) PISTON WITH CAST-IN UNDERCROWN PINS FOR INCREASED HEAT DISSIPATION

(75) Inventors: Mark W. Gillman, Algonac, MI (US); Rodney K. Elnick, Washington, MI (US); Todd R. Ridley, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 28 days.

(21) Appl. No.: 10/602,792

(22) Filed: Jun. 24, 2003

(51) Int. Cl.$^{7}$ .................................................. F16J 1/14
(52) U.S. Cl. ...................................... 92/186; 123/41.38
(58) Field of Search .......................... 92/186, 222, 208, 92/214, 231, 260, 187; 123/41.34, 41.38

(56) References Cited

U.S. PATENT DOCUMENTS 1,073,086 A * 9/1913 Blose ...................... 123/41.38
1,741,032 A * 12/1929 Minter ................ 123/41.82 R
2,213,418 A * 9/1940 Swanson ................. 123/41.38
4,363,293 A * 12/1982 Munoz et al. ........... 123/41.38
4,617,888 A * 10/1986 Dent .......................... 123/307
5,975,040 A * 11/1999 Silvonen et al. .............. 92/220
6,318,243 B1 * 11/2001 Jones .......................... 92/189

* cited by examiner

*Primary Examiner*—Edward K. Look
*Assistant Examiner*—Igor Kershteyn
(74) *Attorney, Agent, or Firm*—Leslie C. Hodges

(57) ABSTRACT

A cast engine piston has a crown with a combustion surface and an undercrown for exposure to crankcase fluids. A plurality of pins extend from the undercrown to increase the surface area of the undercrown. The pins draw heat from the crown and dissipate the heat to the crankcase fluids. Crankcase oil may be sprayed, splashed, or misted against the pins to further increase heat dissipation.

14 Claims, 2 Drawing Sheets

PISTON WITH CAST-IN UNDERCROWN PINS FOR INCREASED HEAT DISSIPATION

TECHNICAL FIELD

This invention relates to internal combustion engines, and more particularly to piston cooling.

BACKGROUND OF THE INVENTION

An engine piston must dissipate the heat energy it absorbs, from the conversion of chemical energy into heat energy and finally into mechanical work, occurring within an engine sequence.

Engine pistons are commonly made of iron or aluminum alloys. A piston has a crown with an upper surface exposed to engine combustion temperatures. The piston undercrown is exposed to crankcase fluids. A ring belt carrying compression and oil control rings extends from the edge of the crown. A piston skirt having curved sidewalls extends from the ring belt to absorb reciprocating thrust forces exerted on the piston. A pin boss may extend between the skirt walls for receiving a wrist pin for connection with a connecting rod.

In operation in an engine, the piston crown absorbs heat from an engine combustion chamber. Heat absorbed by the crown is conducted through the piston to the undercrown, the ring belt, and the skirt. Heat in the ring belt and skirt is conducted to the associated engine cylinder by direct contact and through the piston rings. Heat in the undercrown is transferred to the ring belt or dissipated to crankcase fluids, including air, oil vapors and liquid oil present in the engine crankcase and provided, in part, for piston cooling. The need for high heat transfer to control piston temperatures limits the use of higher strength piston materials, which have lower heat transfer capability.

SUMMARY OF THE INVENTION

The present invention provides a design for increasing piston cooling. The piston may be made of steel or aluminum alloys or other suitable materials. The piston has a crown with an upper surface adapted for exposure to engine combustion temperatures. The piston undercrown is exposed to crankcase fluids. A ring belt for carrying compression and oil control rings extends from the edge of the crown. A piston skirt having curved sidewalls extends from the ring belt to absorb reciprocating thrust forces exerted on the piston. A pin boss may extend between the skirt walls for receiving a wrist pin for connection with a connecting rod.

In accordance with the invention, a plurality of cooling pins are located beneath the crown in locations such as the undercrown, ring belt and pin boss. The pins provide additional undercrown surface area to increase cooling of the piston. The pins may be conical and may be formed during casting of the piston, or they may be preformed and cast in during the piston casting process.

In operation in an engine, the piston crown absorbs heat from an engine combustion chamber. Heat absorbed by the crown is conducted through the piston to the undercrown, the ring belt, and the skirt and connecting rod bosses. Heat in the ring belt and skirt is conducted to the associated engine cylinder by direct contact and through the piston rings. Heat is also conducted to the pins through the undercrown. The pins increase the surface area of the undercrown, which increases heat dissipation to the crankcase fluids. The additional heat transferred through the pins can lower piston crown temperature and may allow the use of higher strength piston materials, which have lower heat transfer capability.

These and other features and advantages of the invention will be more fully understood from the following description of certain specific embodiments of the invention taken together with the accompanying drawings.

DESCRIPTION OF THE PREFERRED EMBODIMENT

Figure 1:
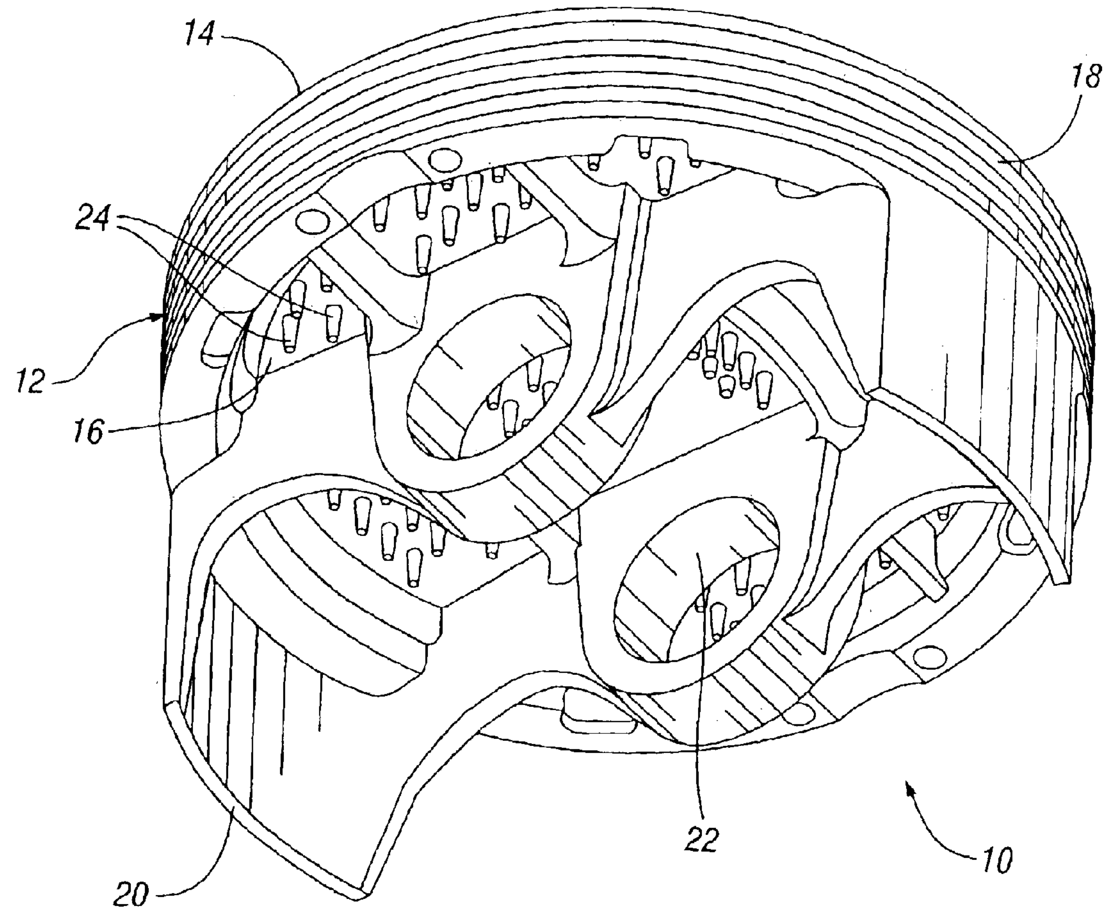
FIG. 1 is a pictorial view of an exemplary engine piston with cooling pins according to the present invention.

Referring to FIG. 1 of the drawings in detail, numeral 10 generally indicates an engine piston made of steel or aluminum alloy or other suitable materials such as titanium or ceramic. The piston includes a crown 12 having an outer crown surface 14 and an undercrown 16. In use, the crown surface 14 is exposed to engine combustion temperatures. The undercrown 16 is exposed to crankcase fluids including air, oil vapor and liquid oil droplets or spray.

A ring belt 18 for carrying compression and oil control piston rings extends downward from the edge of the crown 12. A skirt 20 extends from the ring belt 18 to absorb thrust forces during piston 10 movement. The undercrown 16 of the piston has a pin boss 22 for receiving a wrist pin.

Figure 3:
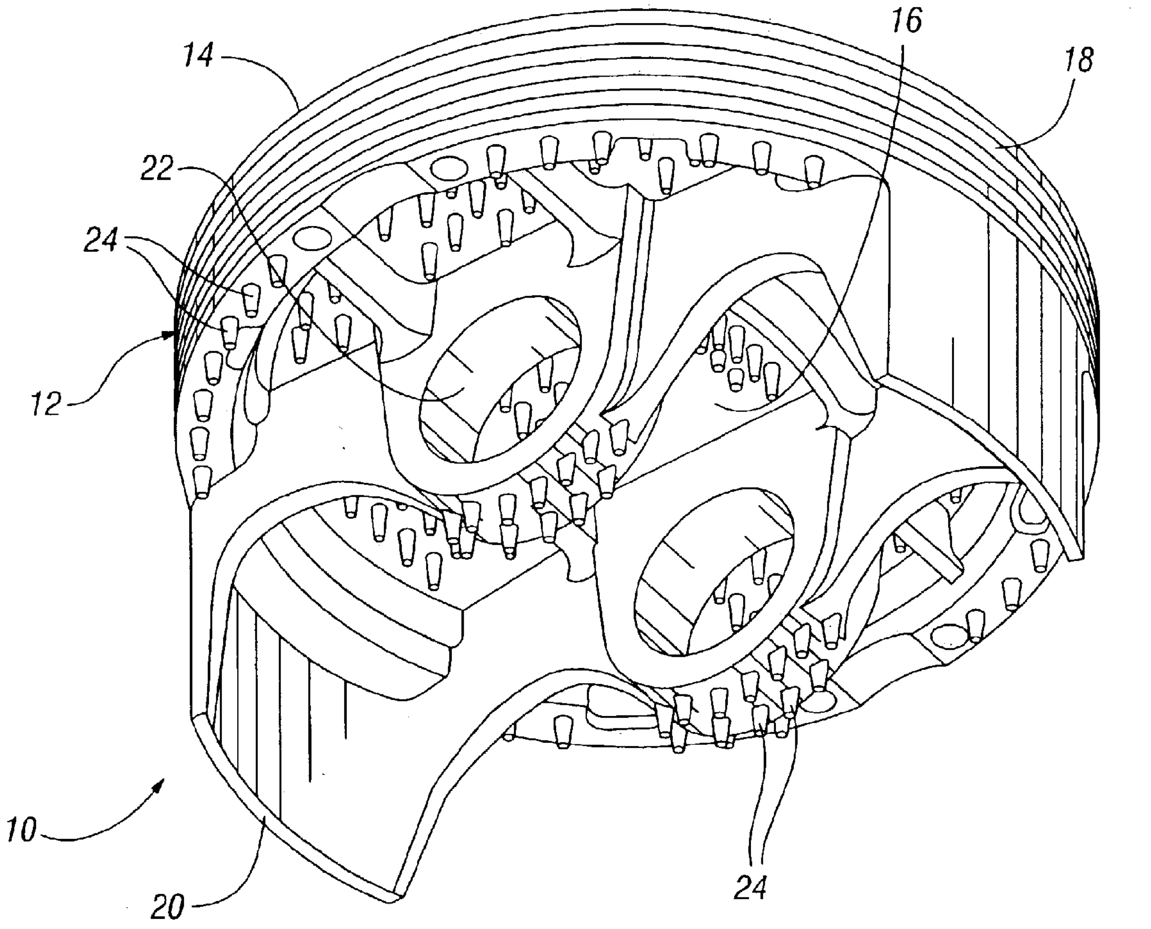
FIG. 3 is pictorial view of an alternative embodiment of an engine piston with cooling pins.

In an exemplary embodiment of the present invention, a plurality of cooling pins 24 extend from the undercrown 16 of the piston 10 to increase the surface area of undercrown 16, as shown in FIG. 1. In an alternative embodiment, pins 24 may also extend downward from the pin boss 22 and the ring belt 18, as shown in FIG. 3. The pins 24 have a conical shape tapered outward toward the undercrown 16. The pins 24 may vary in length to avoid interference with the connecting rod, not shown.

The piston 10 may be formed by casting or forging. The material used to form the piston 10 is typically steel or aluminum alloy. The pins 24 may preformed during the casting process of the piston 10, or they may be separately formed and cast in during the piston casting process. The pin shape may be varied as desired with a larger range of shapes available for cast-in pins (for example, cylindrical).

Figure 2:
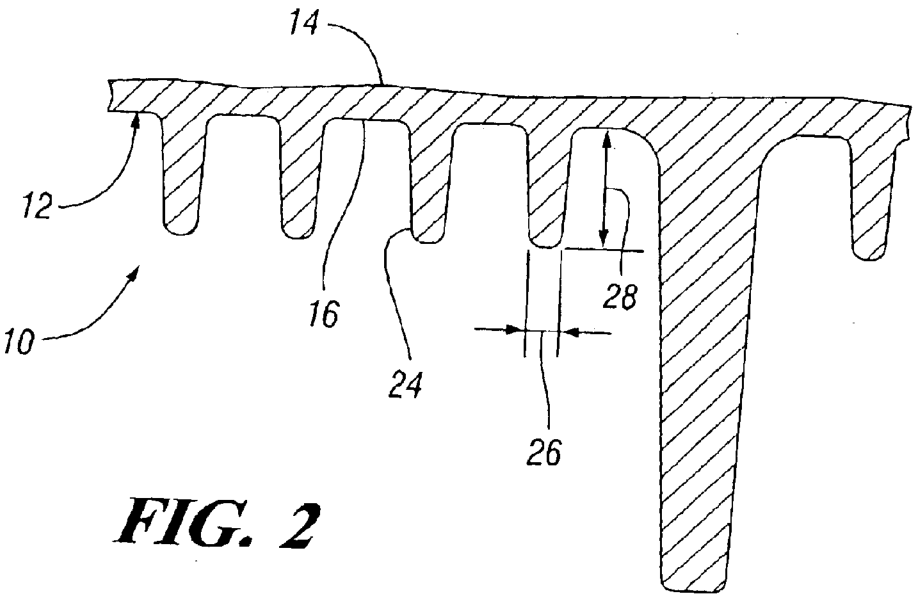
FIG. 2 is a fragmentary cross-sectional view through the piston crown.

FIG. 2 is a fragmentary cross section showing a typical cooling pin configuration in an exemplary embodiment of the present invention. The pins 24 have a conical shape with a diameter 26 from about 1–2 mm and a length 28 of about 2–5 mm. The length 28, diameter 26, and number of the pins 24 may vary depending upon the amount of thermal conductance required.

During engine operation, the piston 10 reciprocates in an engine cylinder wherein fuel is burned in an associated combustion chamber. Some of the heat produced is transferred to the crown surface 14 of the piston 10. The heat is dissipated by conduction through the crown 14 to the ring belt 18, the skirt 20, and the connecting rod bosses to crankcase fluids, air, oil vapor and liquid oil.

As the piston 10 reciprocates in the cylinder, the crankcase fluids contact the piston undercrown 16, including the pins 24. This allows heat from the piston 10 to be transferred through the pins 24 to the surrounding fluids. The additional surface area provided by the pins 24 transfers more heat to the air and other fluids than does the undercrown surface alone.

The piston 10 may be further cooled by misting, squirting, or splashing engine oil on the pins 24 and undercrown 16 of the piston 10. As the oils contacts the undercrown 16 and the pins 24, heat is transferred from the undercrown 16 and the pins 24 into the oil.

The improved cooling by the pins 24 allows the piston 10 to be formed of higher strength alloy materials having lower thermal conductivity. The stronger materials permit shortening piston compression height and increasing engine displacement. The improved cooling of the piston 10 undercrown 16 by the pins 24 rejects more heat into the engine oil and may reduce knock limiting of the engine.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An engine piston having a crown comprising:

an outer crown surface adapted for exposure to engine combustion temperatures;

an undercrown adapted for exposure to crankcase fluids;

a plurality of cooling pins extending from the undercrown for contact with crankcase fluids to assist in cooling the piston crown.

2. A piston as in claim 1 wherein the pins are conical.

3. A piston as in claim 1 wherein the pins are preformed and cast into the piston.

4. A piston as in claim 1 wherein the pins are cast with the piston.

5. A piston as in claim 1 wherein the pins have a length of about 2–5 mm and diameter of about 1–2 mm.

6. A piston as in claim 1 wherein the piston is formed of steel.

7. A piston as in claim 1 wherein the piston is formed of aluminum alloy.

8. A piston as in claim 1 wherein the piston is formed of ceramic.

9. A piston as in claim 1 wherein the piston is formed of titanium alloy.

10. A piston as in claim 1 wherein the piston includes a ring belt with grooves for receiving piston rings.

11. A piston as in claim 10 wherein cooling pins also extend from the ring belt.

12. A piston as in claim 1 wherein the piston includes a skirt for absorbing thrust forces on the pistons.

13. A piston as in claim 1 wherein the piston includes a pin boss for receiving a wrist pin.

14. A piston as in claim 13 wherein cooling pins also extend from the pin boss.

* * * * *